March 11, 1930.  J. PROKSA  1,749,779
MOTION PICTURE APPARATUS
Filed March 21, 1925    14 Sheets-Sheet 2

Witnesses:
William L. Kilroy
Harry R. White

Inventor:
John Proksa
By Neil & Neil
Attys

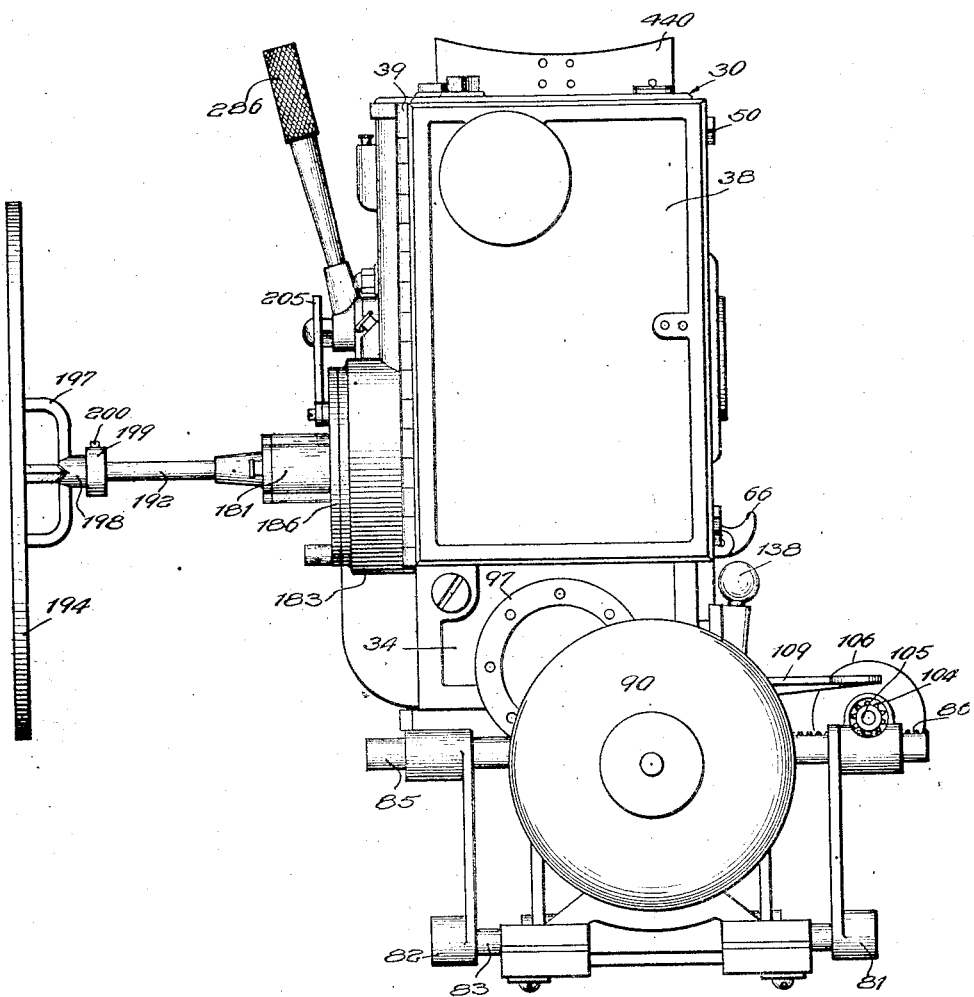

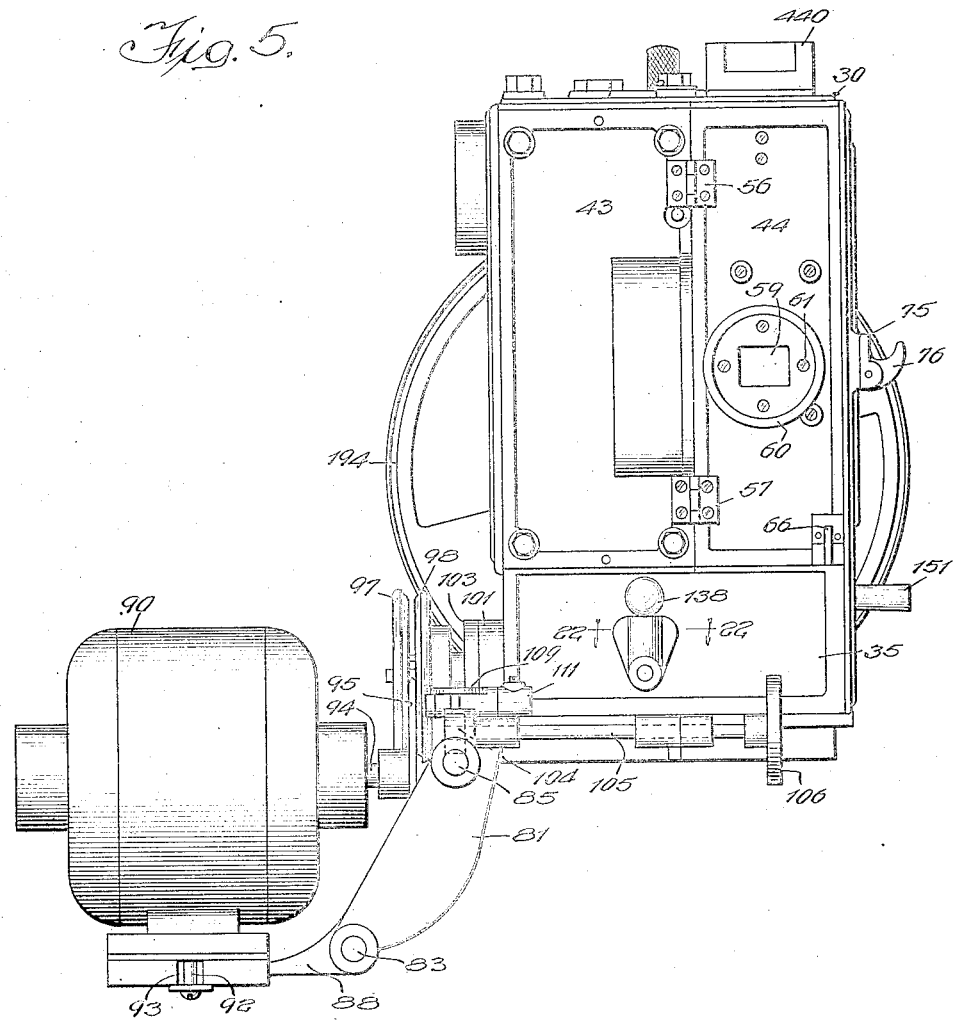

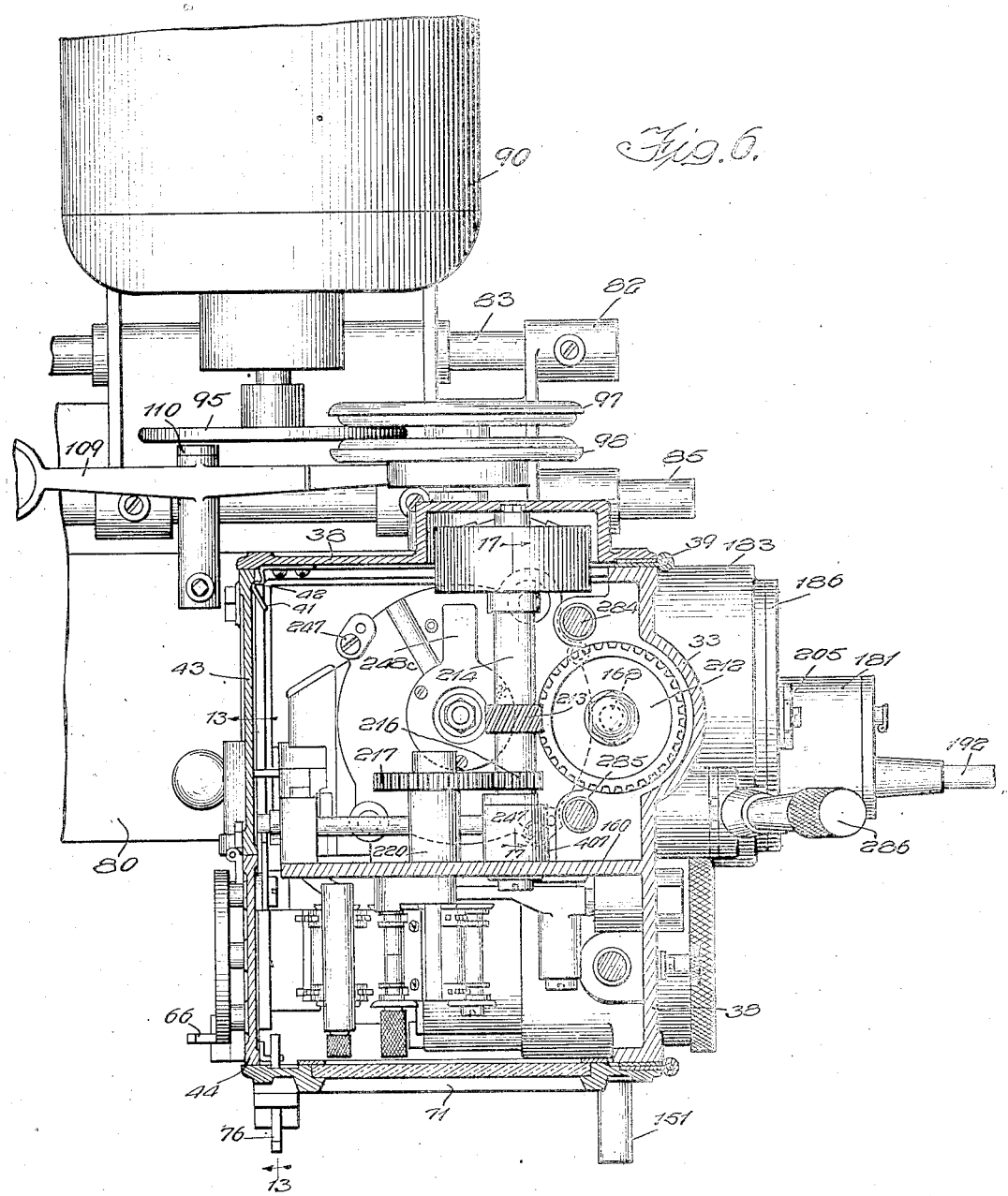

March 11, 1930. J. PROKSA 1,749,779
MOTION PICTURE APPARATUS
Filed March 21, 1925 14 Sheets-Sheet 7
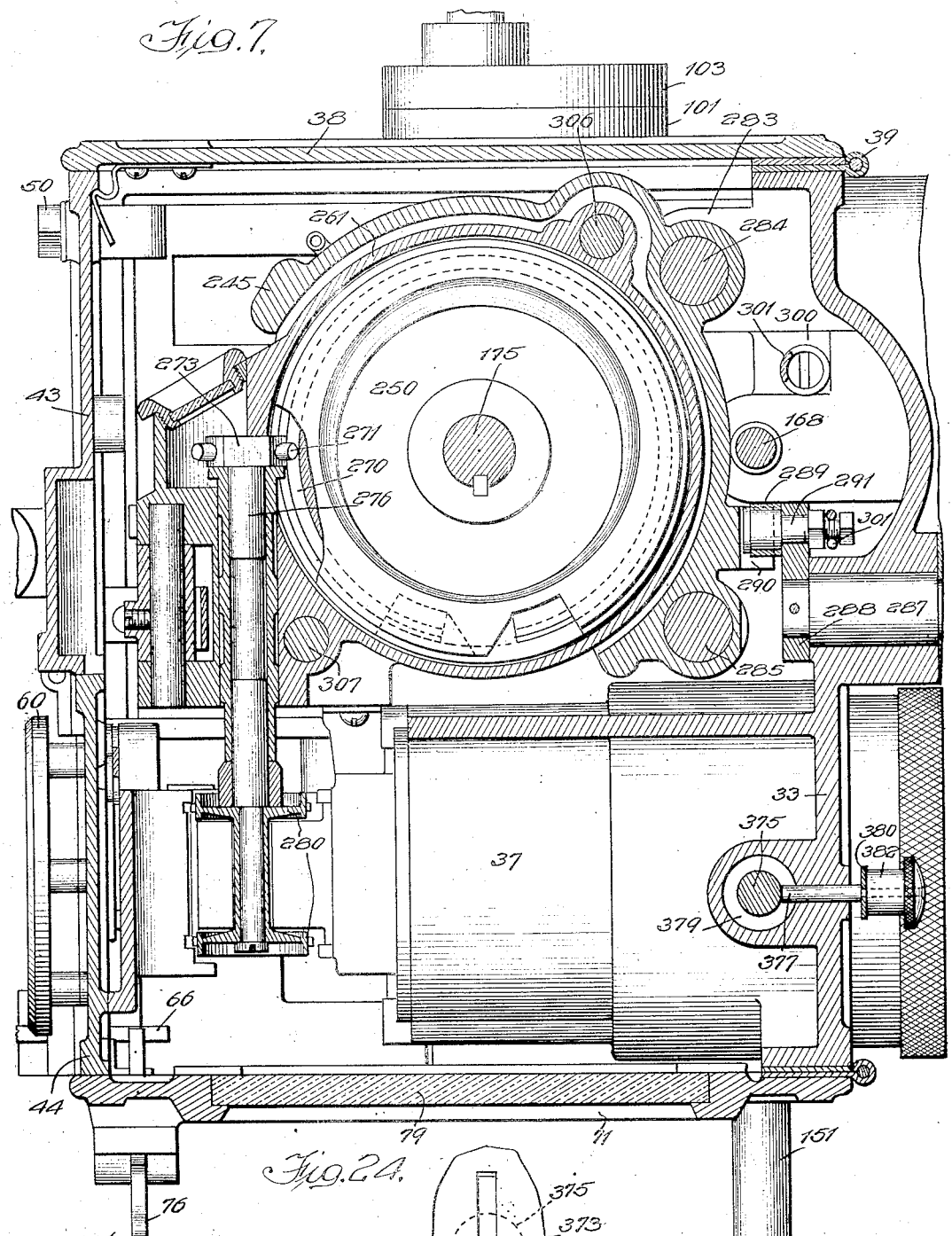
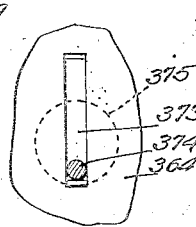

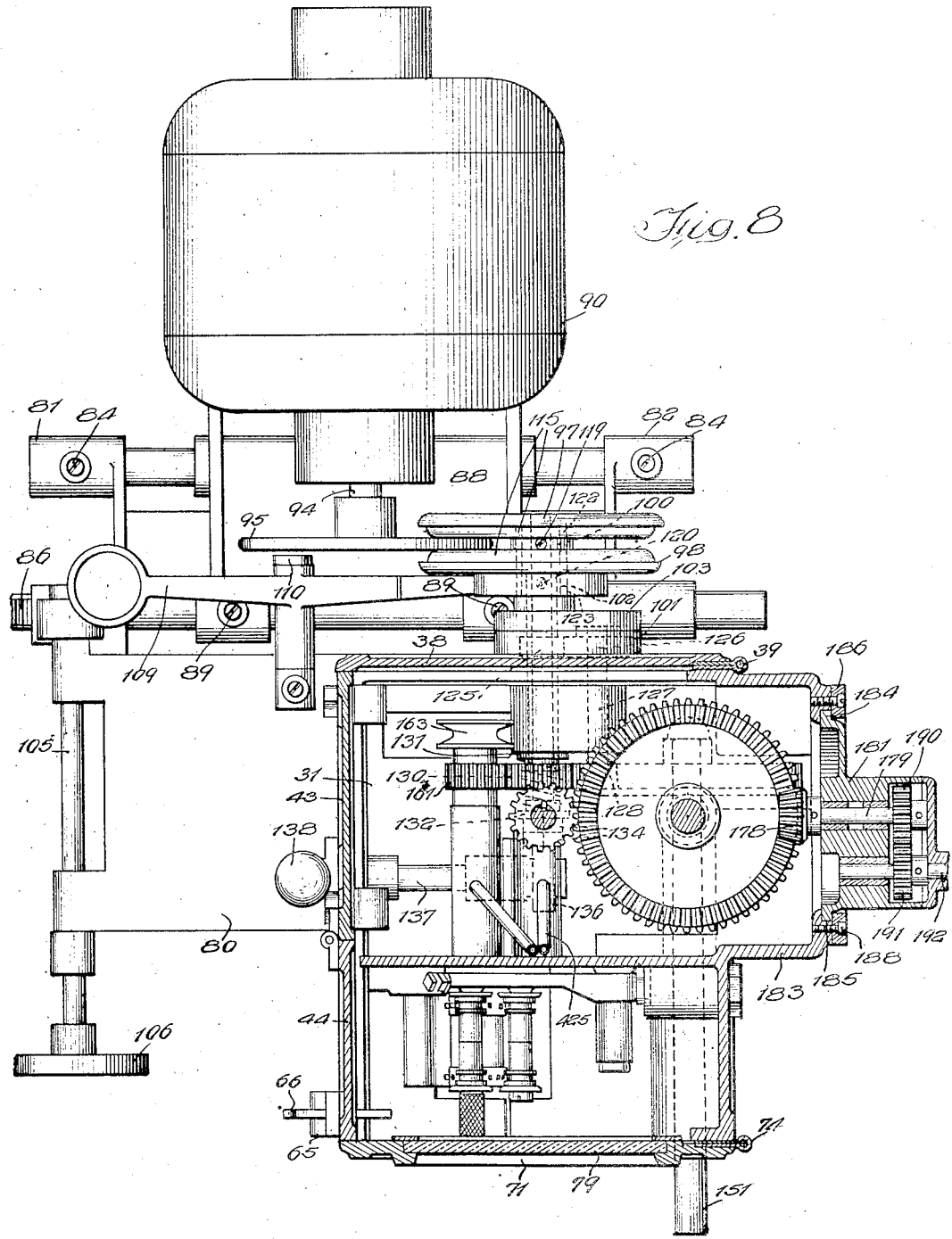

March 11, 1930. J. PROKSA 1,749,779
MOTION PICTURE APPARATUS
Filed March 21, 1925 14 Sheets-Sheet 9
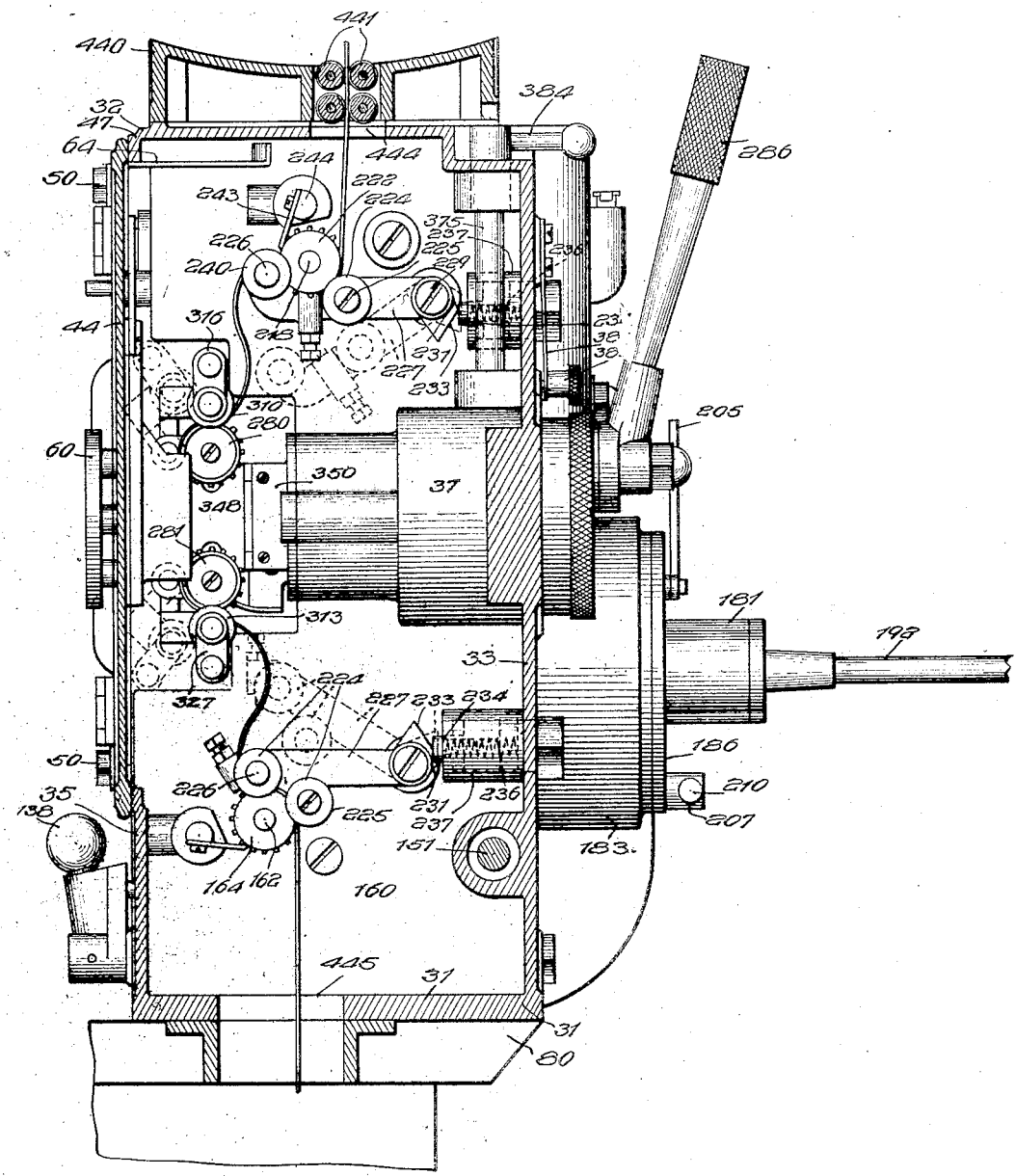

March 11, 1930.  J. PROKSA  1,749,779
MOTION PICTURE APPARATUS
Filed March 21, 1925   14 Sheets-Sheet 10

Inventor.
John Proksa

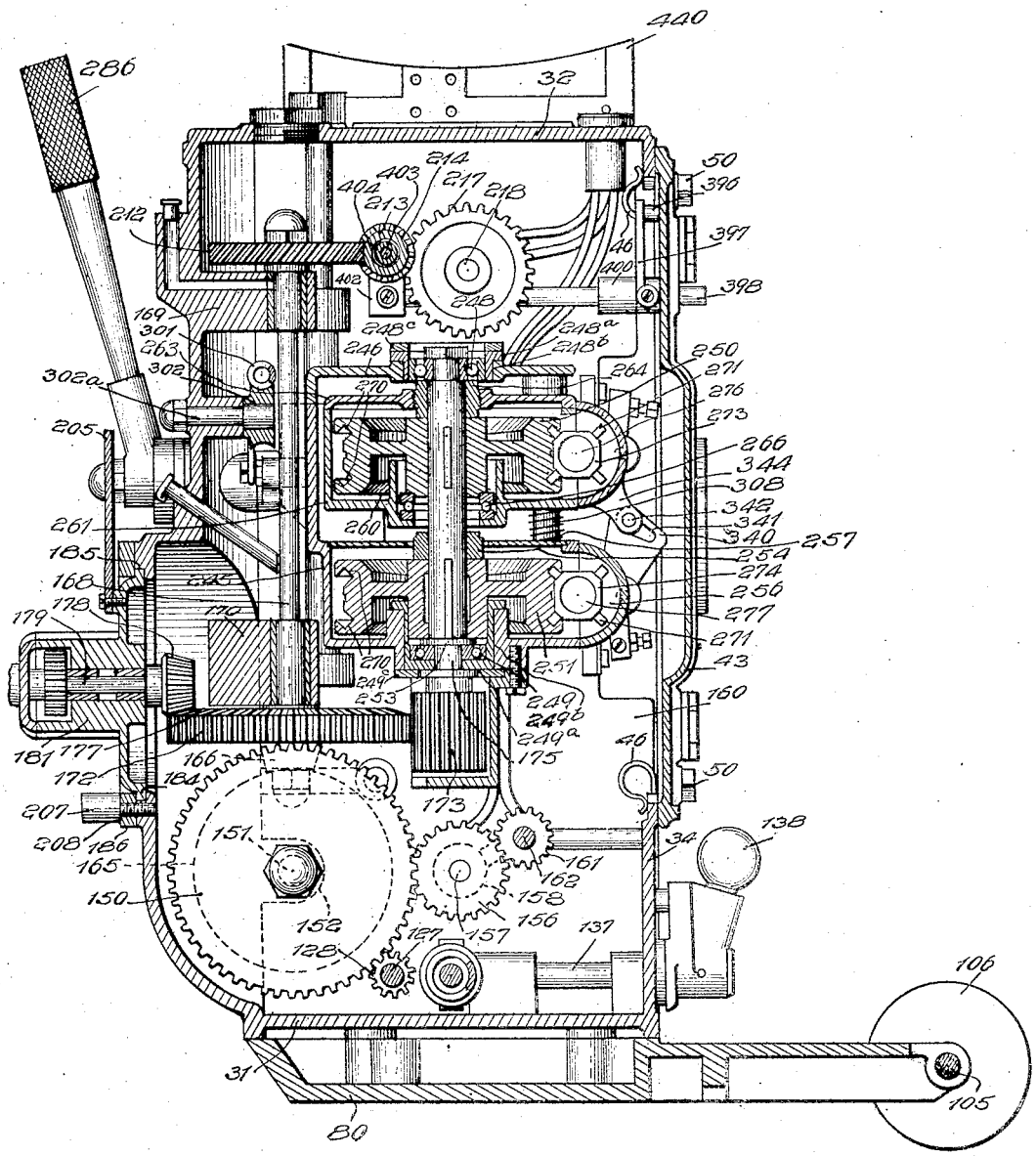

March 11, 1930. J. PROKSA 1,749,779
MOTION PICTURE APPARATUS
Filed March 21, 1925 14 Sheets-Sheet 12
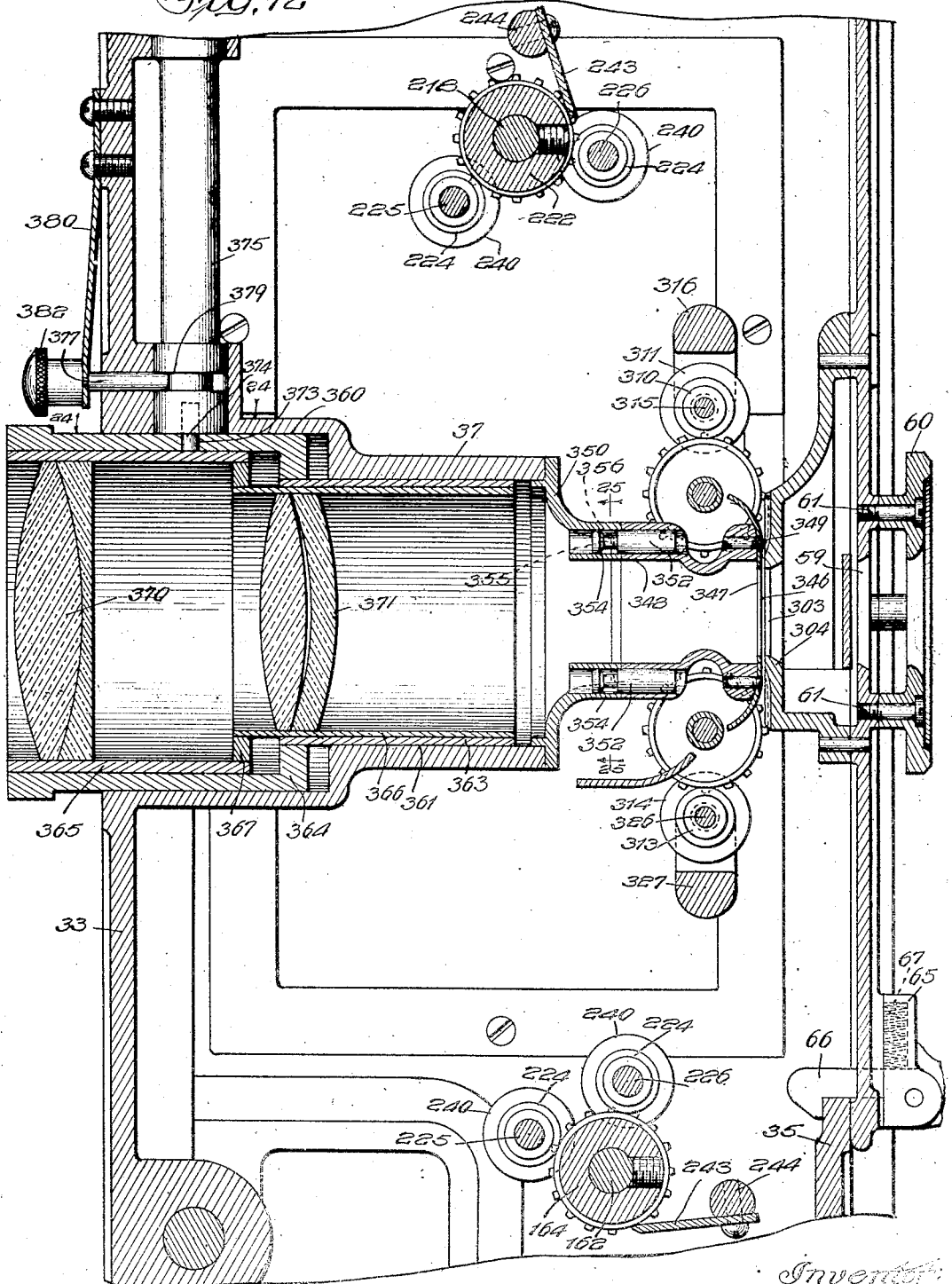

March 11, 1930.   J. PROKSA   1,749,779
MOTION PICTURE APPARATUS
Filed March 21, 1925   14 Sheets-Sheet 13
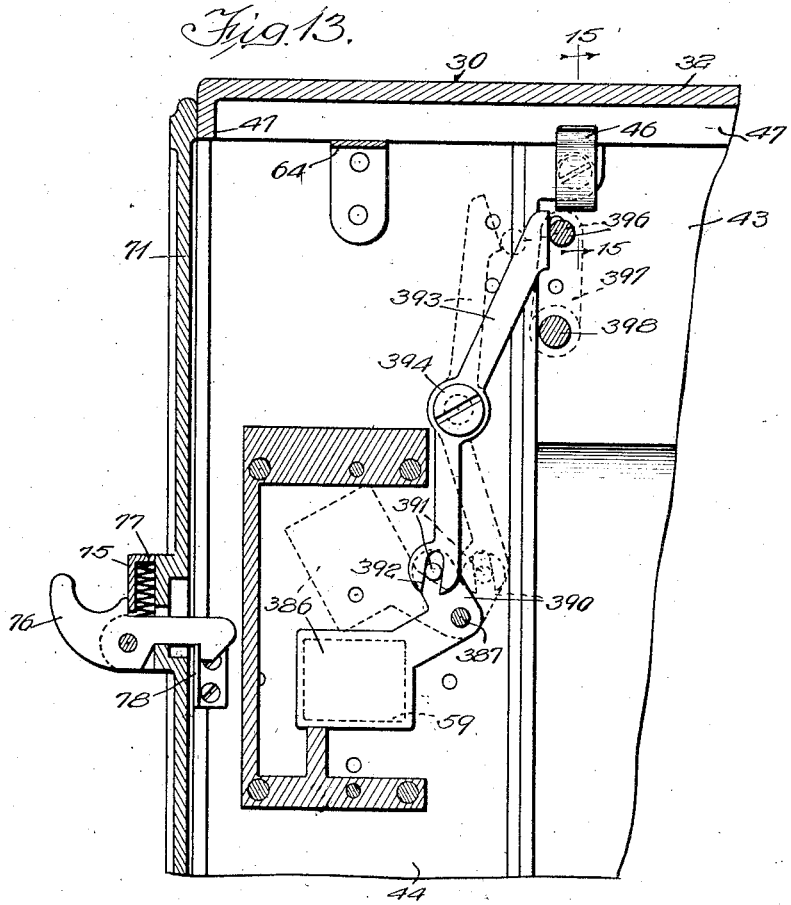
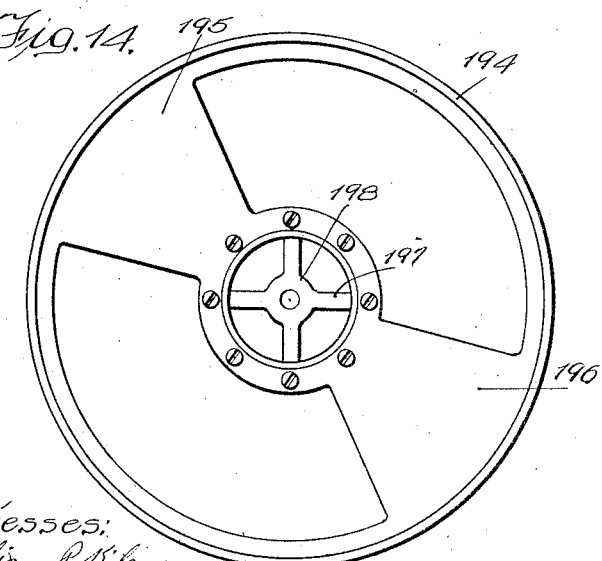
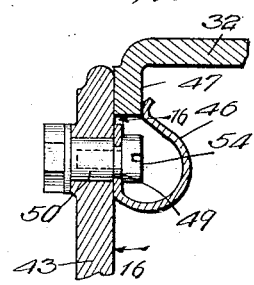
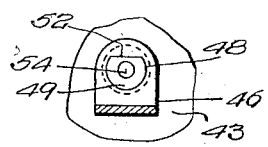

March 11, 1930.                J. PROKSA                1,749,779
                          MOTION PICTURE APPARATUS
                   Filed March 21, 1925      14 Sheets-Sheet 14
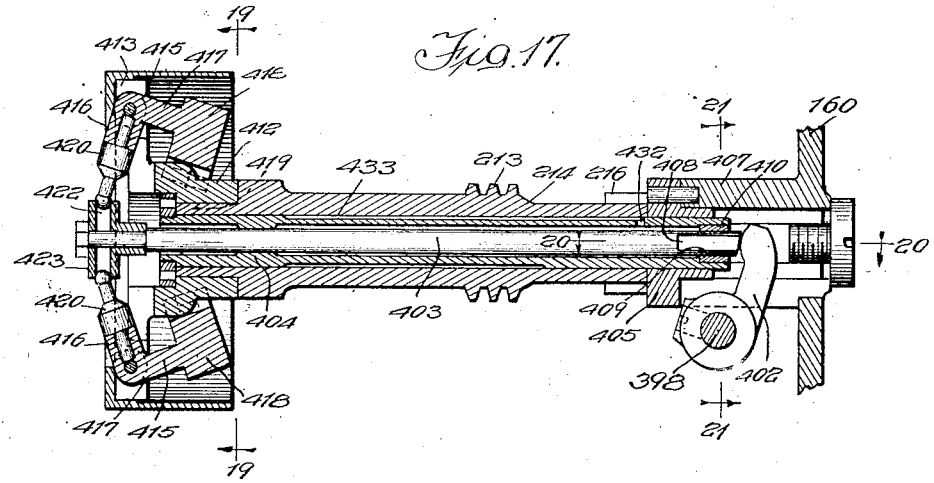
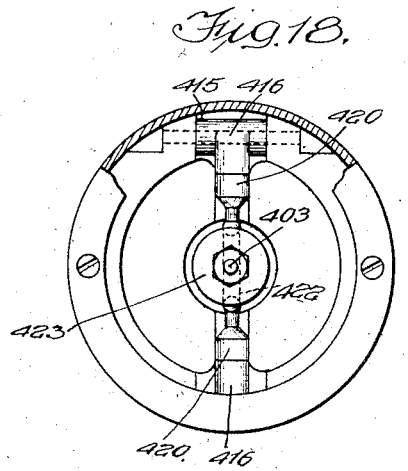
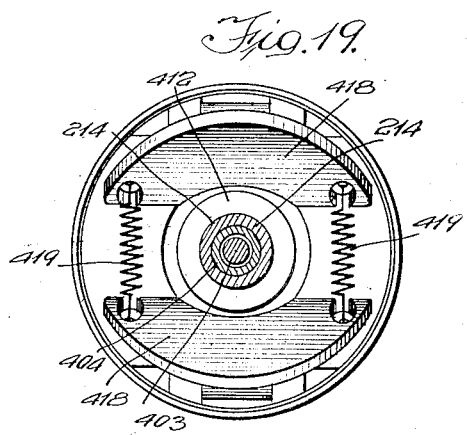
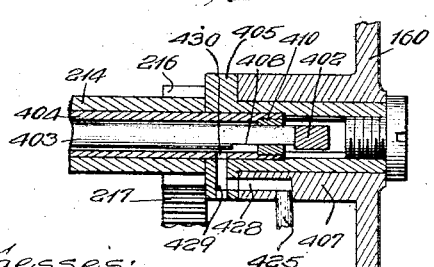
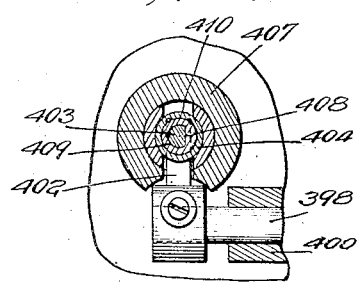
Witnesses:
William P. Kilroy
Harry A. Hitchitt
Inventor:
John Proksa Patented Mar. 11, 1930

1,749,779

UNITED STATES PATENT OFFICE

JOHN PROKSA, OF CHICAGO, ILLINOIS, ASSIGNOR TO HELIOS CORPORATION, OF CHICAGO, ILLINOIS, A CORPORATION OF DELAWARE

MOTION-PICTURE APPARATUS

Application filed March 21, 1925. Serial No. 17,336.

My invention relates to improvements in motion picture projecting apparatus and has among its other objects the production of apparatus of the kind described, which is simple, convenient, compact, durable, reliable, efficient and satisfactory for use wherever found applicable. A particular object of the invention is to provide apparatus of the kind described which is readily accessible for inspection, repairs or adjustment. Another particular object of the invention is to provide motion picture projecting apparatus which may be adjusted while in operation to control its speed, the framing of the pictures, the shutter, etc., so that there will be no loss of time in adjusting the apparatus after the initial picture or title of a film has been flashed upon the screen. Many other objects and advantages of the construction herein shown and described will be obvious to those skilled in the art from the disclosures herein given. To this end my invention consists in the novel construction, arrangement and combination of parts herein shown and described, and more particularly pointed out in the claims.

In the drawings, wherein like reference characters indicate like or corresponding parts:

Fig. 2 is a side elevation looking from the left of the apparatus shown in Fig. 1;

Fig. 4 is a side elevation looking from the right of the apparatus shown in Fig. 1;

Fig. 5 is a rear elevation of the apparatus shown in Fig. 1;

Figure 1:
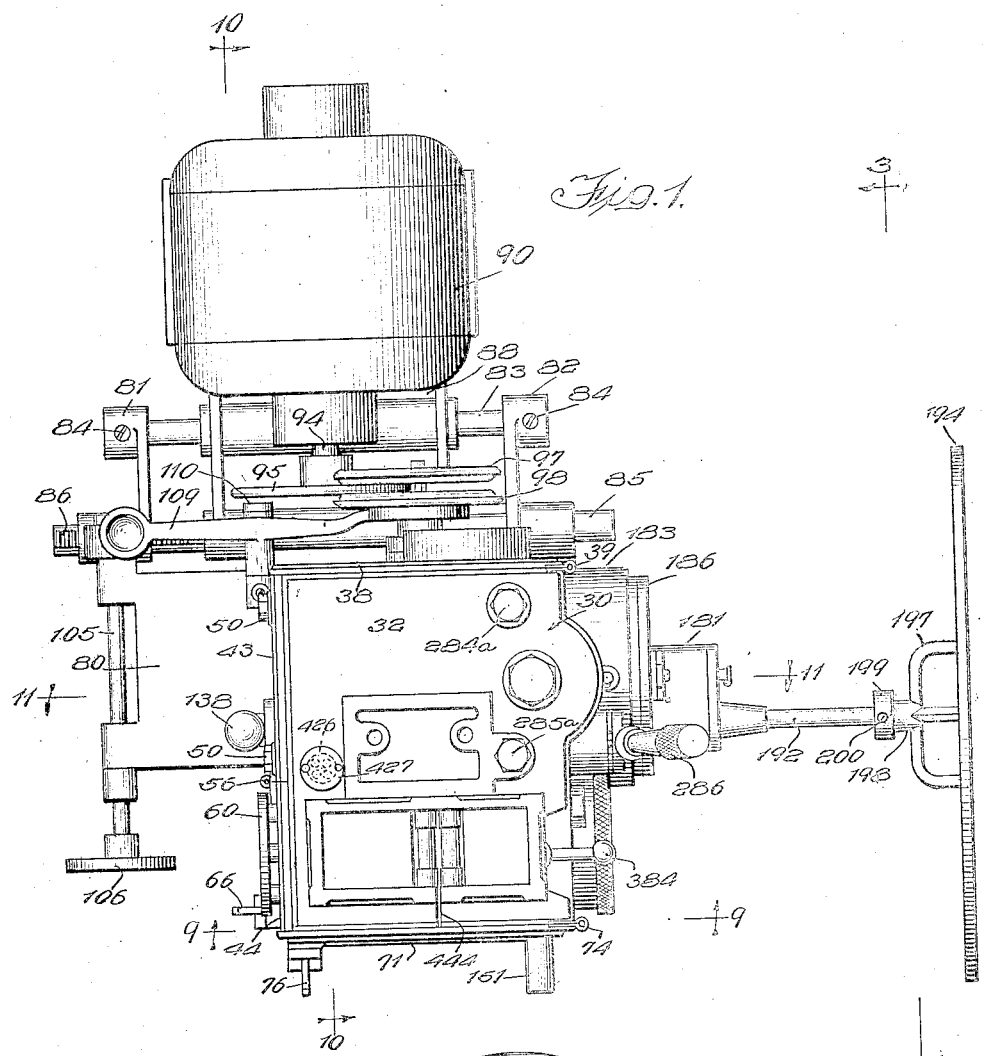
Fig. 1 is a plan view of apparatus embodying the invention.
Figure 3:
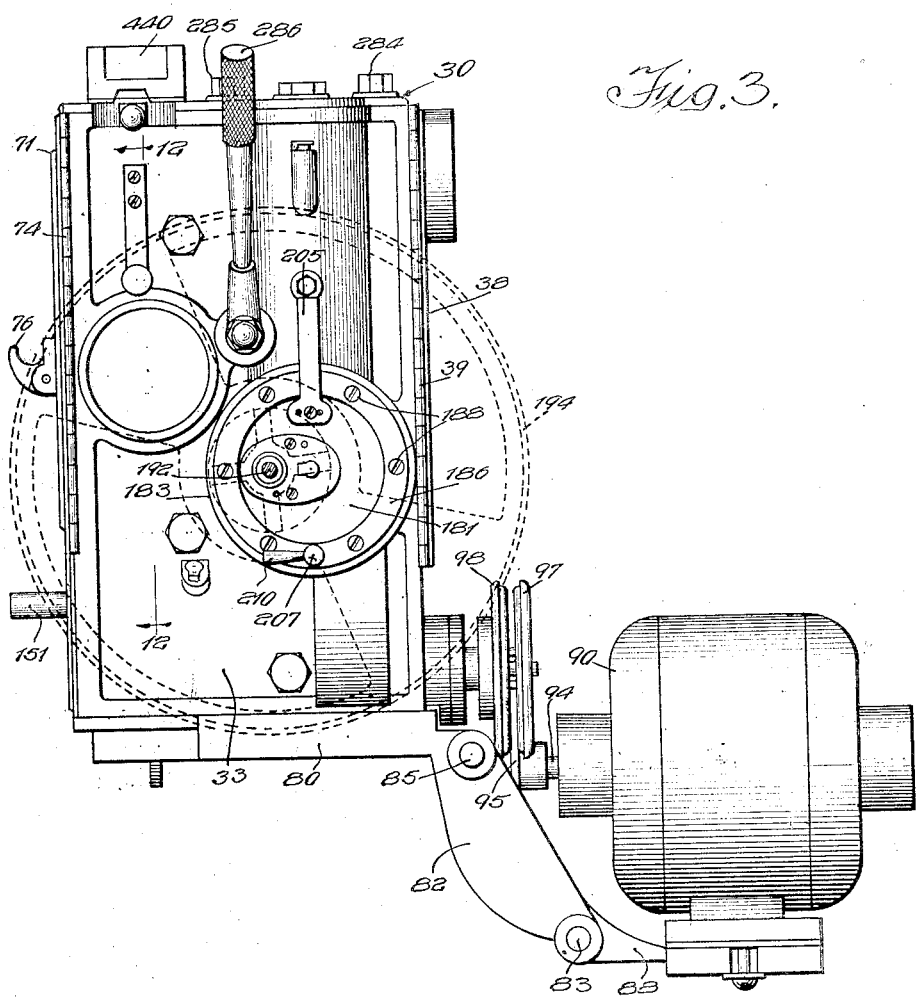
Fig. 3 is a section taken on line 3—3 of Fig. 1.
Figure 10:
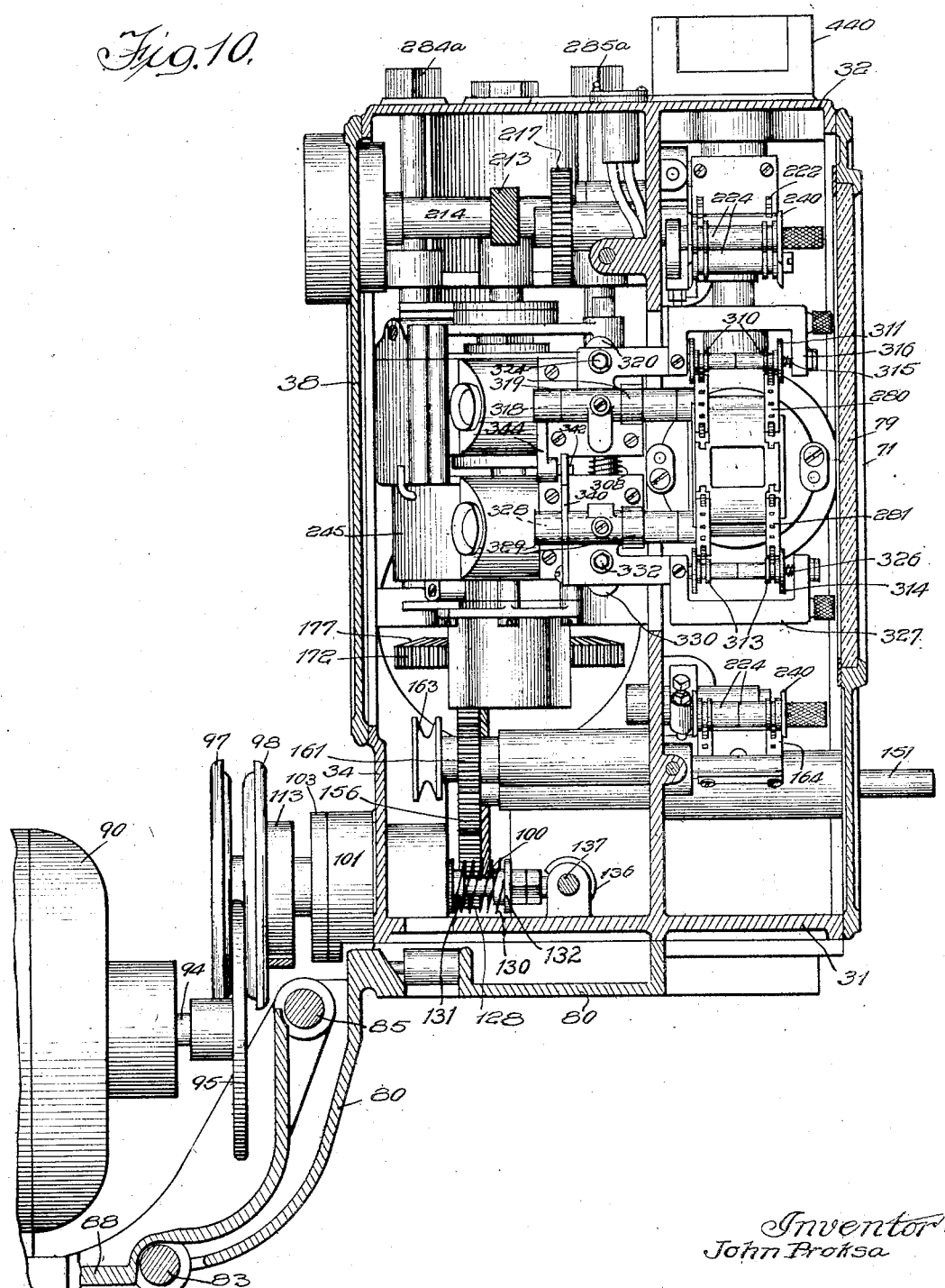

Figs. 6, 7 and 8 are sections taken on line 6—6, 7—7 and 8—8, respectively, of Fig. 2;

Figs. 9, 10 and 11 are sections taken on line 9—9, 10—10 and 11—11, respectively, of Fig. 1;

Fig. 12 is a section taken on line 12—12 of Fig. 3;

Fig. 13 is a section taken on line 13—13 of Fig. 6;

Fig. 14 is a detail front elevation of the shutter;

Fig. 15 is a section taken on line 15—15 of Fig. 13;

Fig. 16 is a section taken on line 16—16 of Fig. 15;

Fig. 17 is a section taken on line 17—17 of Fig. 6;

Fig. 18 is an end elevation looking from the left of the apparatus shown in Fig. 17;

Figs. 19, 20 and 21 are sections taken on line 19—19, 20—20 and 21—21, respectively, of Fig. 17;

Fig. 22 is a section taken on line 22—22 of Fig. 5;

Fig. 23 is a section taken on line 23—23 of Fig. 22;

Fig. 24 is a section taken on line 24—24 of Fig. 12; and

Fig. 25 is a section taken on line 25—25 of Fig. 12.

Referring for the present to Figs. 1 to 4, inclusive, the reference character 30 designates generally a frame or housing which encloses the major portion of the moving parts and is a part of my improved motion picture projecting apparatus and comprises a bottom plate 31, a top plate 32, a front wall 33, a side wall 34 and a rear wall 35, the several enumerated plates and walls being preferably formed integral with each other. Projecting inwardly from the front wall 33 and preferably formed integral therewith is a tubular boss 37 adapted to accommodate a plurality of lenses, as will presently appear. The side wall 34 and the rear wall 35 do not entirely close the respective side and rear ends of the housing 30, the opening in the side wall 34 being normally closed by a door 38 hinged to the front wall 33 by a hinge 39 (Fig. 6). To hold the door 38 in its closed position, a spring latch member 41 secured to the door engages a shoulder 42 formed upon a panel 43, which, together with a door 44 normally closes the opening in the rear wall 35. The panel 43 is removably secured to the top plate 32 and the rear wall 35 by spring clips 46 or the equivalent adapted to engage the rear wall 35 and a flange 47 projecting downwardly from the top plate 32. As shown in Fig. 15, each spring clip 46 is apertured, as at 48, to fit snugly upon a reduced portion 49 of a bolt 50 rotatably journaled in the panel 43. It will be noted that the reduced portion 49 is flattened, as at 52, to prevent angular displacement of the spring clips 46 relative to the bolt 50. A screw 54 secures each spring clip 46 to its respective bolt 50. To remove the panel 43 from the housing 30 it is only necessary to rotate each of bolts 50 through 180° whereupon the spring clips 46 will be disengaged from the top plates and rear wall.

The door 44 is mounted upon the panel 43 by hinges 56 and 57 and is provided with a light projecting aperture 59, the lighting apparatus being positioned immediately behind said aperture. The lighting apparatus is not shown since it forms no part of this invention. The door 44 is protected from the heating effect of the light by a cooling plate 60, which is rigidly secured to the door by bolts or screws 61 (Fig. 12). The movement of the door 44 may be limited by a keeper 64 rigidly secured to the door and adapted to engage the downwardly projecting flange 47 when the door is swung to its open position (Fig. 9).

Pivotally mounted in a bracket 65 secured to the lower portion of the door 44 is a latch member 66 adapted to engage the upper edge of the rear wall 35 when the door is in its closed position. A compression spring 67 disposed in the bracket 65 yieldingly holds the latch member 66 in engagement with the rear wall 35.

That side of the housing 30, which is disposed directly opposite the side wall 34 is normally closed by a corner plate 70 and a door 71, the corner plate 70 being secured by screws 72 to the bottom plate 31 and the front wall 33, and the door 71 being mounted upon the front wall 33 by a hinge 74. Pivotally mounted in a bracket 75 secured to the outer surface of the door 71 is a latch member 76 which is yieldingly urged by a spring 77 into a position wherein it will engage a keeper 78 secured to the inner surface of the door 44 (Fig. 13). It will be noted that the latch member 76 and its associated spring 77 are similar in construction to the latch member 66 and the spring 67, the latch members being so constructed that if their outer ends are depressed the doors 44 and 71 may be swung open. The door 71 is provided with a transparent panel 79 through which the operator may view the operation of the film feeding mechanism.

From the foregoing description of the housing 30, it is apparent that access may be readily had to the film feeding mechanism enclosed therein as the doors 38, 44 and 71 may be brought into their open positions with little effort on the part of the operator, and the panel 43 together with the door 44 may be removed by rotating the bolts 50 to disengage the spring clips 46 from the flange 47 and the rear wall 35.

The housing 30 is preferably mounted upon and secured to a motor support 80, which is in turn mounted upon a suitable base (not shown). The motor support 80 comprises integral bracket arms 81 and 82 in the lower ends of which is mounted a shaft 83, the shaft 83 being secured in the bracket arms by set screws 84. Slidably mounted in the upper end of the bracket arms 81 and 82 is a shaft 85 having a rack 86 cut in one end thereof. Slidably journaled upon the shaft 83 is a bracket 88 which is rigidly secured to the shaft 85 by set screws 89. The bracket 88 is adapted to support an electrical motor 90 which is adjustably secured to the bracket by means of bolts 92 passing through slots 93 formed in the bracket. The motor 90 is provided with a shaft 94 to which is rigidly secured a friction disk 95 adapted to be brought into and out of driving engagement with friction disks 97 and 98 mounted upon a shaft 100. The shaft 100 is slidably journaled in a tubular shaft 102, which is rotatably journaled in a bearing bracket 101 secured to the side wall 34 and in a cap member 103 secured to the bracket 101.

The means for bringing the friction disk 95 into and out of driving engagement with the friction disks 97 and 98 comprises a pinion 104, which meshes with the rack 86 and is secured to a shaft 105 rotatably journaled in the motor support 80. A hand wheel 106 secured to the shaft 105 may be employed to rotate the shaft 105, which, in turn, will rotate the pinion 104 and cause the shaft 85 to move along its longitudinal axis. Such movement of the shaft 85 will be accompanied by a corresponding movement of the motor 90 and the friction disk 95, the motor 90 being secured to the bracket 88, which is, in turn secured to the shaft 85 by set screws 89. It is obvious that the speed at which the shaft 100 is rotated may be increased or decreased by moving the friction disk 95 away from or toward the axis of rotation of the shaft 100. The speed at which the shaft 100 rotates may also be controlled by a brake lever 109 pivotally mounted intermediate its ends upon a pin 110, which projects from a boss 111 formed upon the motor support 80. One end of the lever 109 is adapted to frictionally engage a brake drum 113 formed upon the friction disk 98. This construction is advantageous in that the operator may manipulate the brake lever 109 to control the speed of the shaft 100 and hence the speed of the film feeding mechanism while a title or the like is being flashed upon the screen.

As shown in Fig. 8, the friction disks 97 and 98 are provided with friction inserts or rings 115 which insure an effective driving engagement between the friction disks 97 and 98 and the friction disk 95 when the friction disk 95 is properly positioned between the friction disks 97 and 98. The friction disk 97 is rigidly secured to the shaft 100 by a set screw 119 and the friction disk 98 is rigidly secured to the tubular shaft 102 by a set screw 120. The friction disk 98 is constrained to rotate with the friction disk 97 by pins 122 rigidly secured in the friction disk 97 and slidably engaging bores 123 formed in the friction disk 98. Formed integral with the tubular shaft 102 is a gear 125, which meshes with a gear 126 rigidly secured to a shaft 127 journaled in the bearing bracket 101, the shaft 127 being provided with a pinion 128 for a purpose which will presently appear.

The friction disk 97 is yieldingly urged toward the friction disk 98 by a compression spring 130 which is interposed between a collar 131 fixed upon the tubular shaft 102 and a collar 132 slidably mounted upon the shaft 100. The force with which the spring 130 urges the friction disk 97 toward the friction disk 98 may be varied by manipulating nuts 134 which are threaded upon the shaft 100 and against which the collar 132 rests. The inner end of the shaft 100 rides upon a cam 136, which is rigidly secured to a shaft 137 rotatably journaled in the housing 30. Secured to the outer end of the shaft 137 is a lever 138 having an arcuate recess 139 formed in the inner face thereof. A pair of shallow depressions 140 and 141 formed in the bottom of the arcuate position 139 are engageable by a ball 143 which is yieldingly urged toward the lever 138 by a compression spring 144. The ball 143 is slidably mounted in a plug 145 projecting from the rear wall 35. When the ball 143 is resting in the depression 140 the shaft 137 will be held in a position wherein the cam 136 will permit the friction disk 97 to be held in frictional engagement with the friction disk 95 by the spring 130. When the lever 138 is moved into a position wherein the ball 143 will rest in the depression 141, the cam 136 will be brought into a position wherein it will prevent the friction disk 97 from engaging the friction disk 95.

The above described mechanism associated with the motor 90 and operatively connecting the motor to the pinion 128 is more fully shown and described in my co-pending application No. 17,337, filed March 21, 1925.

Referring now to Fig. 11, the pinion 128 meshes with a gear 150 secured upon a shaft 151 which is rotatably journaled in a lug 152 formed upon the front wall 33. One end of the shaft 151 projects through the corner plate 70 and is adapted to receive a crank or the like whereby the operator may drive the film feeding mechanism, if, for any reason, he does not desire to use the motor 90, or if the motor is not available. Meshing with the gear 150 is a gear 156, which is rotatably journaled upon a pin 157 projecting from a boss 158 formed upon a partition 160, the partition 160 extending from the front wall 33 to the rear wall 34 and being formed integral therewith. The gear 156 meshes with a pinion 161 secured to a shaft 162 which is rotatably journaled in a bearing formed in the partition 160 and has rigidly secured to it a film take-up sprocket drum 164. Also secured to the shaft 162 is a sheave 163 whereby a take-up reel (not shown) may be driven.

A bevel gear 165 formed integral with the gear 150 meshes with a bevel gear 166 rigidly secured upon the lower end of a vertically disposed shaft 168. The shaft 168 is rotatably journaled in lugs 169 and 170 formed upon the front wall 33. Also secured to the lower end of the vertically disposed shaft 168 is a spur gear 172 which meshes with an elongated pinion 173 secured to the lower end of a vertically disposed shaft 175. The construction is such that the shaft 175 may be moved along its longitudinal axis without withdrawing the pinion 173 from operative engagement with the spur gear 172.

Formed integral with the spur gear 172 is a bevel gear 177 which meshes with a bevel gear 178 secured to a shaft 179 which is rotatably journaled in a bracket 181 mounted in a hollow boss 183 projecting from the front wall 33. The bracket 181 is rotatably journaled in the hollow boss 183, the bracket 181 being provided with an annular flange 184 seated in a recess 185 turned in the outer end of the hollow boss. A collar 186 secured to the hollow boss 183 by screws 188 engages the annular flange 184 and prevents withdrawal of the bracket 181 from the boss. It will be noted that the axis of rotation of the bracket 181 is coincident with the axis of rotation of the shaft 179. Pinned to the outer end of the shaft 179 is a pinion 190, which meshes with a pinion 191 pinned to a shaft 192 rotatably journaled in the bracket 181 and in a cap 193 fixed to the bracket, the axis of the shaft 192 being eccentrically disposed with respect to the axis of rotation of the bracket. Carried by the outer end of the shaft 192 is a shutter 194 which preferably comprises two diametrically disposed fan-shaped blades 195 and 196, the shutter being mounted upon a spider 197 having a split hub 198. A collar 199 seated upon the hub 198 is provided with a set screw 200, whereby the split hub 198 may be clamped to the shaft 192 as shown in Fig. 14. The narrow portions of the fan-shaped blades 195 and 196 are disposed adjacent the axis of rotation of the shutter so that the blades increase in width toward the outer ends thereof. When the apparatus is in operation the blades 195 and 196 will alternately intercept the beam of light projected upon the screen in a manner well known to those skilled in the art, one of the blades being adapted to intercept the beam of light when the film is being advanced and the other blade being adapted to intercept the beam of light during that time a picture is being projected upon the screen so that the rapid changes from dark to light will be less pronounced.

In my improved construction, the bracket 181 may be revolved around its axis of rotation to bring the bracket into a plurality of laterally adjusted positions in which the shutter 194 occupies adjusted positions with respect to the light projecting aperture 59. The arrangement is such that the shutter 194 may be made to synchronize with the intermittent motion of the film so that the beam of light will be intercepted during the entire time the film is in motion.

A handle 205 secured to the bracket 181 provides means whereby the operator may shift the bracket into the desired position. The bracket 181 may be secured in the desired position by a post 207 threaded into the hollow boss 183 and provided with a shoulder 208 adapted to cause the collar 186 to clamp the flange 184 against the hollow boss. The post 207 is provided with a handle 210, whereby it may be readily manipulated.

Rigidly secured to the upper end of the vertically disposed shaft 168 is a spiral gear 212, which meshes with a spiral gear 213, which is formed upon a tubular member 214. Also formed upon the tubular member 214 is a pinion 216, which meshes with a gear 217 secured to a shaft 218 rotatably journaled in a boss 220 formed integral with the partition 160. Secured to one end of the shaft 218 and aligned with the take-up sprocket drum 164 is a feed sprocket drum 222. When the apparatus is in operation the sprocket drums 164 and 222 are continuously driven and are adapted to withdraw the film from a supply reel (not shown) positioned above the housing 30.

Cooperating with each of the sprocket drums is a plurality of grooved rollers 224 adapted to hold the film in proper engagement with the teeth of the sprocket drums (Fig. 9). The grooved rollers 224 are rotatably mounted upon pins 225 and 226 carried by a lever 227 which is pivotally mounted upon one of a plurality of pins 229 projecting from the partition 160. Each lever 227 is provided with two angularly disposed surfaces 231 and 233 engageable by a hollow pin 234 which is slidably urged toward the angularly disposed surfaces by a compression spring 236, the compression spring 236 being disposed in a hollow boss 237, which projects inwardly from the front wall 33 and in which the pin 234 is slidably journaled. It is apparent that when either of the pins 234 is in engagement with one of the associated angularly disposed surfaces 231 and 233, its spring 236 will yieldingly prevent angular displacement of the lever 227 into a position wherein the pin would engage the other of the angularly disposed surfaces. The arrangement is such that when a pin 234 is in engagement with the surface 231 the grooved rollers 224 will hold the film in mesh with the associated sprocket drum, and when the pin 234 is in engagement with the surface 233 these rollers 224 will be held in the positions wherein they are shown in dotted lines in Fig. 9. Each grooved roller 224 is provided with a flange 240 adapted to engage an edge of the film so as to align the film with the sprocket drums. Associated with each sprocket drum 164 and 222 is a plate 243 secured to a pin 244 projecting from the partition. The plates 243 are adapted to strip the film from the sprocket drums in the event that the film tends to adhere thereto.

Referring now to Fig. 11, the aforementioned shaft 175 is rotatably mounted in a casing 245 and in a cap 246, which is secured to the casing by screws 247, ball bearings 248 and 249 being provided for this purpose. The ball bearing 248 has its outer race secured in a bushing 246$^a$ which is rotatably mounted in a bore 248$^b$ formed in the cap 246, the ball bearing being eccentrically disposed with respect to the longitudinal axis of the bore. One race of the ball bearing 249 is secured in a bushing 249$^a$ rotatably journaled in a bore 249$^b$ formed in the casing 245. The ball bearing 249 is eccentrically disposed with the longitudinal axis of the bore 249$^b$. The bushings 248$^a$ and 249$^a$ are provided with levers 248$^c$ and 249$^c$, respectively, whereby the bushings may be rotated to adjust mechanism hereinafter described. Mounted upon the shaft 175 are cams 250 and 251, the cam 251 being keyed to the shaft 175 and being held against longitudinal displacement relative to the shaft by collar 253 formed upon the shaft and by a collar 254 driven upon the shaft. The cam 251 is disposed in a well 256 formed in the lower portion of the casing 245, the well 256 being provided with a closure plate 257 and being adapted to hold any suitable lubricant. The cam 250 is splined upon the shaft 175 and is disposed in a well 260 formed in a casing 261 provided with a cap 263, the well 260 being also adapted to hold a supply of lubricant. A sleeve 264 threaded into the cap 263 and a ball bearing 266 interposed between the cam 250 and the casing 261 prevent longitudinal displacement of this cam relative to the casing 261. The cam 250 and the casing 261 with its cap 263 may move as a unit up and down upon the shaft 175, the cam being constrained to rotate with the shaft. The cams 250 and 251 are preferably of the type disclosed in my U. S. Patent #1,170,991 of February 8, 1916, and each cam is provided with a pair of oppositely inclined counterpart grooves 270 adapted to be engaged and traversed by a plurality of prongs 271 radially disposed upon one of a plurality of star wheels 273 and 274, the star wheel 273 being associated with the cam 250 and the star wheel 274 being associated with the cam 251. The cams 250 and 251 may be accurately aligned with the star wheels 273 and 274, respectively, by manipulating the levers 248ᶜ and 249ᶜ to move the shaft 175 relatively to the star wheels.

As clearly described in the aforementioned patent, each revolution of one of the cams 250 and 251 is accompanied by rotation of the associated star wheel through an angle of 90 degrees, so that when the cams 250 and 251 are continuously driven the star wheels 273 and 274 will be intermittently driven. However, the present invention is not limited to cams and star wheels of the described construction as any equivalent structure may be employed. The star wheels 273 and 274 are preferably secured to shafts 276 and 277, respectively, the shaft 276 being rotatably journaled in the casing 261 and the shaft 277 being rotatably journaled in the casing 245. Secured to the shafts 276 and 277, respectively, and aligned with the sprocket drums 164 and 222 are sprockets 280 and 281 for intermittently advancing the film.

The casing 245 is slidably journaled upon a pair of vertically disposed pins 284 and 285 and may be raised and lowered by means comprising a lever 286, which is secured to a shaft 287 pivotally mounted in the front wall 33, the shaft 287 having a lever 288 secured to its inner end, which lever 288 carries an anti-friction roller 289 engaging a groove 290 formed in the casing 245. The pins 284 and 285 are provided with hexagonal heads 284ᵃ and 285ᵃ, respectively, adapted to receive a wrench or the like and they are screw threaded into the top plate 32. Lugs 283 formed upon the front wall 33 are apertured to receive the shank portions of the pins 284 and 285. The anti-friction roller 289 is journaled upon a pin 291 mounted in the free end of the lever 288. Secured to a lug 300 formed upon the front wall 33 is one end of a helical spring 301, which is trained over a sheave 302 and has its other end secured to the pin 291. The sheave 302 is journaled upon a pin 302ᵃ projecting from the front wall 33. This construction is more clearly shown and described in my Patent No. 1,708,521, issued April 9, 1929, the arrangement being such that the spring 301 counterbalances the casings 245 and 261 and the mechanism carried thereby. It will be readily understood, however, that the lever 287 may be manipulated to raise and lower the casings 245 and 261 as a unit and the mechanism carried thereby as a unit and that the sprockets 280 and 281 may be brought into a plurality of adjusted positions with respect to a light projecting aperture 303 formed in a plate 304 mounted upon the inner side of the door 44 (Fig. 12). This is to permit the pictures to be properly framed upon the screen.

Projecting through the casing 261 and rigidly secured thereto are a pair of vertically disposed pins 306 and 307, which are slidably journaled in the casing 245 and the cap 246. Compression springs 308 disposed around the pins 306 and 307 are interposed between the casings 245 and 246 and tend to hold the casing 162 in a position wherein the sleeve 264 bears against the inner race of the ball bearing 248. This construction permits the sprockets 280 to be moved toward the sprockets 281 when the film is to be threaded through the apparatus so that the springs 308 may afterwards increase the distance between the sprockets 280 and 281 to draw the film taut. The film is held in engagement with the teeth of the sprockets 280 by a pair of grooved rollers 310 having flanges 311 adapted to engage the edges of the film. In a like manner the film is held in engagement with the teeth of the sprockets 281 by a pair of grooved rollers 313 having flanges 314 adapted to engage the edges of the film. The grooved rollers 310 are rotatably journaled upon a pin 315 carried in a bracket 316 which is pivotally mounted upon a pin 318 secured in a pair of lugs 319 formed integral with the casing 261. The rollers 310 may be swung out of their functionally operative positions whenever a film is to be threaded through the apparatus. A leaf spring 320 secured to the casing 261 is adapted to yieldingly hold the bracket in or out of the position wherein the rollers 310 are operatively engaging the sprockets 280. The position which the rollers 310 will assume with respect to the sprockets 280, when they are in their functionally operative positions, is adjustable to a relatively small extent by a screw 324 which may be manipulated to move the rollers with respect to the sprockets.

The grooved rollers 313 are carried by a pin 326 mounted in a threading lever or bracket 327 which is, in turn, pivotally mounted upon a pin 328, the pin 328 being rigidly secured in a pair of lugs 329 formed upon the casing 245. The rollers 313 may be swung into and out of their functionally operative positions with respect to the sprockets 281. A leaf spring 330 secured to the casing 245 is adapted to yieldingly hold the bracket 327 in or out of the position wherein the rollers 313 are operatively engaging the sprockets 281. The functionally operative position of the rollers 313 may be varied by manipulating a screw 332. A plate 334 secured to the casing 245 will strip the film from the sprockets 281 if the film tends to adhere thereto.

Secured to the bracket 327 is a plate 340 having a cam slot 341 in which rides a pin 342 projecting from a lug 344 formed integral with the casing 245. The cam slot 341 is so designed that when the rollers 313 are brought into their functionally inoperative positions with respect to the sprockets 281, the casing 261 will be drawn toward the casing 245 against the action of the springs 308. This, as hereinbefore explained, permits the film to be trained over the sprockets 280 and 281 in such manner that when the rollers 313 are restored to their functionally operative positions the strip of film between the sprockets 280 and the sprocket 281 is suitably tensioned.

The above described mechanism closely associated with the sprockets 280 and 281 is more clearly shown and described in my Patent No. 1,708,521, issued April 9, 1929.

An best shown in Fig. 12, a plate 346 is positioned intermediate the sprockets 280 and 281, the plate 346 being in close proximity to the plate 304 when the door 44 is in its closed position. During the operation of the apparatus the film passes through the slot so formed between the plates 304 and 346. The plate 346 is provided with a light projecting aperture 347 aligned with the aperture 303 and designed to cooperate with the aperture 303 to frame the pictures. The plate 346 is secured to a tubular member 348 by screws 349, the tubular member 348 being detachably secured to an apertured cap 350 closing the inner end of the tubular boss 37. The means for securing the tubular member 348 to the apertured cap 350 comprises a plurality of pins 352 rigidly secured in and projecting from the tubular member 348. Each pin 352 projects into the cap 350 and is provided with an inclined annular shoulder 354 engageable by the pointed end 355 of a screw 356, the screw 356 being threaded into the apertured cap 350. It is obvious that the screws 356 may be manipulated to draw the tubular member 348 tightly against the apertured cap 350.

The tubular boss 37 is provided with an outer bore 360 and an inner bore 361, the inner bore 361 being of less diameter than the outer bore 360. Slidably journaled in the inner bore 361 is a tube 363 which has its outer end rigidly secured to a tube 364 slidably journaled in the outer bore 360. Secured in the tube 364 is a sleeve 365 which is secured to a sleeve fitted into the tube 363, a collar 367 being interposed between the sleeve 365 and the sleeve 366. A lens 370 is mounted in the sleeve 365 and a lens 371 is mounted in the sleeve 366. A circumferentially disposed slot 373 formed in the tube 364 is engageable by a pin 374 projecting from a vertically disposed shaft 375 which is rotatably journaled in the housing 30, the pin 374 being eccentrically mounted with respect to the axis of rotation of the shaft 375. The shaft 375 is held against longitudinal displacement by a pin 377 which rides in an annular groove 379 formed in the lower end of the shaft. A leaf spring 380 secured to the outer surface of the front wall 33 yieldingly holds the pin 377 in engagement with the annular groove 379, the pin being provided with a head 382, whereby the operator may withdraw the pin from the groove so that the shaft 375 may be withdrawn from the apparatus. Secured to the upper end of the shaft 375 is a lever 384, whereby the shaft 375 may be oscillated to focus the lens 370 and the lens 371, it being apparent that oscillation of the shaft will be accompanied by longitudinal movement of the tubes 363 and 364 and the sleeves 365 and 366.

Carried by the door 44 and disposed intermediate this door and the plate 304 is a fire door 386, which is pivotally mounted upon the door 44 by means of a pin 387, the fire door 386 being of sufficient size to close the light projecting aperture 59 formed in the door 44. Formed integral with the fire door 386 is an arm 390 from which projects a pin 391. The pin 391 rides in a slot 392 formed in one end of a lever 393 which is pivoted intermediate its ends upon the door 44, a screw 394 being provided for this purpose. When the door 44 is in its closed position, the other end of the lever 393 is engageable by a pin 396 projecting from the free end of a lever 397 which is rigidly secured to one end of a shaft 398 rotatably journaled in bosses 400 formed upon the partition 160. Secured to the other end of the shaft 398 is a lever 402, the free end of which is engageable by a pin 403 slidably journaled in a sleeve 404, one end of the sleeve 404 being secured in a collar 405, which is pinned to the inner end of a tubular boss 407 projecting from the partition 160. The pin 403 is flattened as at 408 to slide in a like shaped aperture 409 formed in a bushing 410, the bushing 410 being fixed in one end of the sleeve 404. This construction prevents rotation of the pin 403 around its longitudinal axis. The sleeve 404 rotatably journals the aforementioned tubular member 214, the tubular member 214 having secured thereto at its outer end a collar 412 having an annular flange 413. Pivotally mounted in the flange 413 are a pair of bell crank levers 415, each bell crank lever comprising arms 416 and 417. Each arm 417 carries a weight 418 and each arm 416 is provided with an extension 420 engaging a bore 422 formed in a collar 423 which is journaled on the outer end of the pin 403. A plurality of tension springs 419 tend to draw the weights 418 toward each other. When the apparatus is in operation, the centrifugal force generated by the weights 418 will cause the bell crank lever 415 to push the pin 403 in a direction which will rotate the shaft 402 in a clockwise direction (Fig. 17). The shaft 402, when so rotated, will cause the pin 396 carried by the lever 397 to angularly displace the lever 393 in a counter-clockwise direction (Fig. 13). This displacement of the lever 393 will cause the fire door 386 to move to the position wherein it is shown in dotted lines in Fig. 13, thus permitting light to pass through the several light projecting apertures. The centrifugally operated apparatus above described is preferably so designed that the fire door 386 will not uncover the light projecting apertures until the film is being advanced at a predetermined speed.

Means is provided whereby lubricant can be supplied to the pin 403 and to the outer surface of the sleeve 404. This means comprises a bent tube 425 which has its upper end secured in a bore 426 formed in the top plate 32 and normally closed by a pivoted plate or disk 427. The lower end of the tube 425 communicates with a bore 428 formed in the tubular boss 407, the bore 428 communicating in turn with a passage 429 formed in the collar 405. The passage 429 communicates with the pin 403 by way of an aperture 430 formed in the sleeve 404. Any suitable lubricant poured into the upper end of the tube 425 will, of course, gravitate through the tube to the pin 403 and lubricate the contacting surfaces of the pin and sleeve 404. The sleeve 404 is apertured as at 432 and is provided with a groove 433, the groove 433 opening into the aperture 432. It is obvious that lubricant can flow from the space between the pin 403 and the sleeve 404 to the groove 433, whereupon the lubricant will be distributed over the bearing surfaces between the sleeve and the tubular member 214.

Mounted upon the upper surface of the top plate 32 is a bracket 440 in which are journaled a plurality of rollers 441, the rollers 441 being disposed in pairs, one pair being arranged above the other. The rollers 441 are aligned with the sprocket drum 222 and are adapted to guide the film to the sprocket drum. The rollers 441 also function to prevent destruction of the film, in that, if the portion of film which is passing through the housing 30 is set on fire, the flame cannot pass the rollers and cause the film on the supply reel to become damaged. The top plate 32 and the bottom plate 31 are provided with slots 444 and 445, respectively, through which the film may be passed when it is being threaded through the apparatus.

The aforementioned pins 284 and 285 are removably secured in the housing 30 so that removal of these pins and removal of the tubular member 348 will permit the casings 245 and 261, the sprockets 280 and 281 and the mechanism carried by the casings to be removed as a unit from the apparatus; or, if so desired, the pin 285 and the tubular member 348 may be removed from the housing and the casings and intermittent sprockets together with the mechanism carried by the casings may be swung outwardly around the pin 284. This construction is advantageous in that it facilitates assembling of the apparatus and permits the operator to repair any slight damage which may be caused to the apparatus during the operation thereof.

In the operation of the apparatus a loaded supply reel (not shown) is positioned above the housing 30 and an empty take-up reel (not shown) is positioned below the housing, means (not shown) being provided whereby the sheave 163 may drive the take-up reel. Preferably each of the doors 44 and 71 is brought to its open position. The grooved rollers 224 are moved to the positions indicated by dotted lines in Fig. 9 and the grooved rollers 310 and 313 are moved into their functionally inoperative positions with respect to the sprockets 280 and 281, respectively. Movement of the grooved rollers 313 to their functionally inoperative positions is accompanied, of course, by movement of the sprockets 280 toward the sprockets 281. A section of film is then withdrawn from the supply reel and passed through the slots 444 and 445 into alignment with the sprocket drums 222 and 164 and the sprockets 280 and 281. The manner in which the film is threaded through the apparatus in this embodiment of the invention is indicated in Fig. 9 but it will be obvious to those skilled in the art that the apparatus may be otherwise arranged without departing from the spirit of my invention. The grooved rollers 310 and 313 are then restored to their functionally operative positions, thus causing the sprockets 280 to draw away from the sprockets 281 so as to tension the portion of film disposed between the sprockets. The grooved rollers 224 are then moved into positions wherein they are shown in Fig. 9 and the motor 90 is connected with any suitable source (not shown) of the electrical energy. The hand wheel 106 is then manipulated to bring the friction disk 95 into an operative position with respect to the friction disks 97 and 98, the lever 138 being then manipulated to affect a driving engagement between the friction disk 95 and the friction disks 97 and 98. It is apparent that the speed at which the apparatus is driven may be varied while the film is being advanced. This may be accomplished by manipulating the hand wheel 106 to move the friction disk 95 toward or away from the axis of rotation of the shaft 100. The apparatus is so constructed that the direction of rotation of the motor 90 may be reversed to have the apparatus withdraw the film from the take-up reel (not shown).

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In apparatus of the kind described and in combination, film advancing means, an electric motor, means including a plurality of relatively movable friction disks for operatively connecting the motor to the film advancing means, said disks being arranged in parallel planes and common means for displacing the motor and one of said disks to change the speed at which the film is advanced.

2. In apparatus of the kind described and in combination, film advancing means, a friction member operatively connected to the film advancing mean, an electric motor, a second friction member operatively connected to the motor, said friction members having parallel axes of rotation and means for moving the motor and the second friction member as a unit into and out of a position wherein the second friction member engages the first friction member.

3. In apparatus of the kind described and in combination, film advancing means, a friction member operatively connected to the film advancing means, an electric motor, a second friction member operatively connected to the motor, said friction members having parallel axes of rotation, means for moving the motor and second friction member as a unit into a position, wherein the second friction member may be engaged by the first friction member, and yielding means for holding the first friction member in engagement with the second friction member.

4. In apparatus of the kind described and in combination, film advancing means, a friction member operatively connected to the film advancing means, an electric motor, a second friction member operatively connected to the motor, means for moving the motor and second friction member as a unit into a position, wherein the second friction member may be engaged by the first friction member, a third friction member operatively connected to the film advancing means, and yieldable means for causing relative movement between the first and third friction members to affect a driving engagement between them and the second friction member.

5. In apparatus of the kind described and in combination, a frame having a light projecting aperture, a shutter, a centrifugally operated means for bringing said shutter into and out of alignment with said aperture, said centrifugally operated means comprising a tube rigidly secured in the frame, a pin slidably journaled in the tube, a member rotatably journaled on the tube and provided with two sets of gear teeth, weights pivotally mounted on said member and operatively connected to the pin, means operatively connecting the pin to the shutter, means meshing with one set of gear teeth for driving said member, a film-advancing sprocket, and means meshing with the other set of gear teeth for driving the sprocket.

6. In apparatus of the kind described and in combination, a frame having a light projecting aperture, a shutter, a centrifugally operated means for bringing said shutter into and out of alignment with said aperture, said centrifugally operated means comprising a tube rigidly secured in the frame, a pin slidably journaled in the tube, a member rotatably journaled on the tube, weights pivotally mounted on said member and operatively connected to the pin, means operatively connecting the pin to the shutter, a duct communicating with the inner surface of the tube, whereby lubricant may be supplied between the tube and the pin, and a passage through the tube, whereby lubricant may flow from the inner surface thereof to lubricate the bearing surfaces between the tube and said member.

7. In apparatus of the kind described and in combination, a frame having a light projecting aperture, a rotatable member for intermittently advancing the film, a second rotatable member for intermittently advancing the film, means for causing relative movement between said first rotatable member and said second rotatable member to tension the film, means for displacing said first and second rotatable members relative to the light projecting aperture when they are in operation, a rotatable shutter associated with the light projecting aperture and adjustable transversely of the projected light.

8. In apparatus of the kind described and in combination, a frame having a light projecting aperture, a rotatable member for intermittently advancing a film, a second rotatable member for intermittently advancing the film, means for causing movement between said first and second rotatable members to tension the film, means operable when the film is being advanced for adjusting said first and second rotatable members with respect to the light projecting aperture, a shutter laterally adjustable during rotation thereof, and means for rotating the shutter and for driving said first and second rotatable members.

9. In apparatus of the kind described and in combination, a frame having a light projecting aperture, a rotatable member for intermittently advancing a film, a second rotatable member for intermittently advancing the film, means for causing movement between said first and second rotatable members to tension the film, means operable when the film is being advanced for adjusting said first and second rotatable members with respect to the light projecting aperture, a shutter, means for rotating the shutter and for driving said first and second rotatable members, and means operable when said first and second rotatable members are in operation for synchronizing the shutter with said first and second rotatable members.

10. In apparatus of the kind described and in combination, a frame having a light projecting aperture, a rotatable member for intermittently advancing a film, a second rotatable member for intermittently advancing the film, means for causing movement between said first and second rotatable members to tension the film, means operable when the film is being advanced for adjusting said first and second rotatable members with respect to the light projecting aperture, a shutter laterally adjustable during rotation thereof, means including friction members for actuating the said first and second rotatable members and for rotating the shutter, and means for displacing the friction members relative to each other to change the speed at which the film is advanced.

11. In apparatus of the kind described and in combination, a frame having a light projecting aperture, a rotatable member for intermittently advancing a film, a second rotatable member for intermittently advancing the film, means for causing relative movement between said first rotatable member and said second rotatable member to tension the film, and a rotatable shutter associated with the light projecting aperture and adjustable transversely of the projected light.

12. In apparatus of the kind described and in combination, a frame having a light projecting aperture, a rotatable member for intermittenly advancing a film, a second rotatable member laterally spaced from the first rotatable member for intermittently advancing the film, means for displacing said first and said second rotatable members relative to the light projecting aperture when they are in operation, and a rotatable shutter associated with the light projecting aperture and adjustable transversely of the projected light.

13. In apparatus of the kind described and in combination, a sprocket engageable with a film for advancing it, a second sprocket engageable with the film for advancing it, a star wheel constrained to rotate with the first sprocket, a second star wheel constrained to rotate with the second sprocket, a cam for intermittently rotating the first star wheel, a second cam for intermittently rotating the second star wheel, an eccentrically mounted shaft carrying said cams and constrained to rotate therewith, means having eccentric bores for journaling said shaft, means for rotating said last-mentioned means to bring the cams into adjusted positions with respect to the star wheels, and means for driving said shaft.

14. In apparatus of the kind described and in combination, means engageable with a film for advancing it, a star wheel constrained to rotate with said means, a cam for intermittently rotating the star wheel, a shaft carrying said cam and constrained to rotate therewith, means for driving said shaft, and means for laterally displacing said shaft to bring the cam into adjusted positions relative to the star wheel.

15. In apparatus of the kind described and in combination, a sprocket engageable with a film for advancing it, a second sprocket engageable with the film for advancing it, a star wheel constrained to rotate with the first sprocket, a second star wheel constrained to rotate with the second sprocket, a cam for intermittently rotating the first star wheel, a second cam for intermittently rotating the second star wheel, a shaft carrying said cams and constrained to rotate therewith, means for laterally displacing said shaft to bring the cams into a plurality of adjusted positions with respect to the star wheels, and means for driving said shaft.

In testimony whereof, I have hereunto signed my name.

JOHN PROKSA.